United States Patent
Tada et al.

(10) Patent No.: US 12,504,445 B2
(45) Date of Patent: Dec. 23, 2025

(54) CURRENT DETECTION CIRCUIT

(71) Applicant: KABUSHIKI KAISHA TOYOTA JIDOSHOKKI, Kariya (JP)

(72) Inventors: Yoshifumi Tada, Kariya (JP); Katsuya Usami, Kariya (JP); Satoshi Okada, Kariya (JP); Atsushi Oshima, Kariya (JP); Yuma Sato, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 134 days.

(21) Appl. No.: 18/599,604

(22) Filed: Mar. 8, 2024

(65) Prior Publication Data
US 2024/0329086 A1  Oct. 3, 2024

(30) Foreign Application Priority Data

Mar. 28, 2023  (JP) .................................. 2023-052036

(51) Int. Cl.
*G01R 1/20* (2006.01)
*G01R 15/14* (2006.01)
*G01R 19/00* (2006.01)

(52) U.S. Cl.
CPC ........... *G01R 1/203* (2013.01); *G01R 15/146* (2013.01); *G01R 19/0092* (2013.01)

(58) Field of Classification Search
CPC ... G01R 1/203; G01R 15/146; G01R 19/0092
See application file for complete search history.

(56) References Cited

U.S. PATENT DOCUMENTS

| | | | |
|---|---|---|---|
| 2015/0245490 A1* | 8/2015 | Kondou | H05K 1/11 |
| | | | 174/260 |
| 2017/0307658 A1* | 10/2017 | Chiku | G01R 15/14 |
| 2021/0181238 A1* | 6/2021 | Chao | G01R 15/09 |
| 2022/0308092 A1* | 9/2022 | Masuda | G01R 15/146 |

FOREIGN PATENT DOCUMENTS

| | | |
|---|---|---|
| JP | 2002-191179 A | 7/2002 |
| JP | 2012-149934 A | 8/2012 |
| JP | 2019-012017 A | 1/2019 |

* cited by examiner

*Primary Examiner* — Thang X Le
(74) *Attorney, Agent, or Firm* — Sughrue Mion, PLLC

(57) ABSTRACT

A substrate includes first connection patterns, a first aggregation pattern, second connection patterns, and a second aggregation pattern. The first connection patterns are respectively provided for first terminals of shunt resistors and electrically connected to the first terminals. The first aggregation pattern extends in an arrangement direction of the shunt resistors and aggregates the first connection patterns. The first aggregation pattern is electrically connected to a first end of a first sensing pattern and has a wider pattern width than the first sensing pattern. The second connection patterns are respectively provided for second terminals of the shunt resistors and electrically connected to the second terminals. The second aggregation pattern extends in the arrangement direction and aggregates the second connection patterns. The second aggregation pattern is electrically connected to a first end of a second sensing pattern and has a wider pattern width than the second sensing pattern.

3 Claims, 3 Drawing Sheets

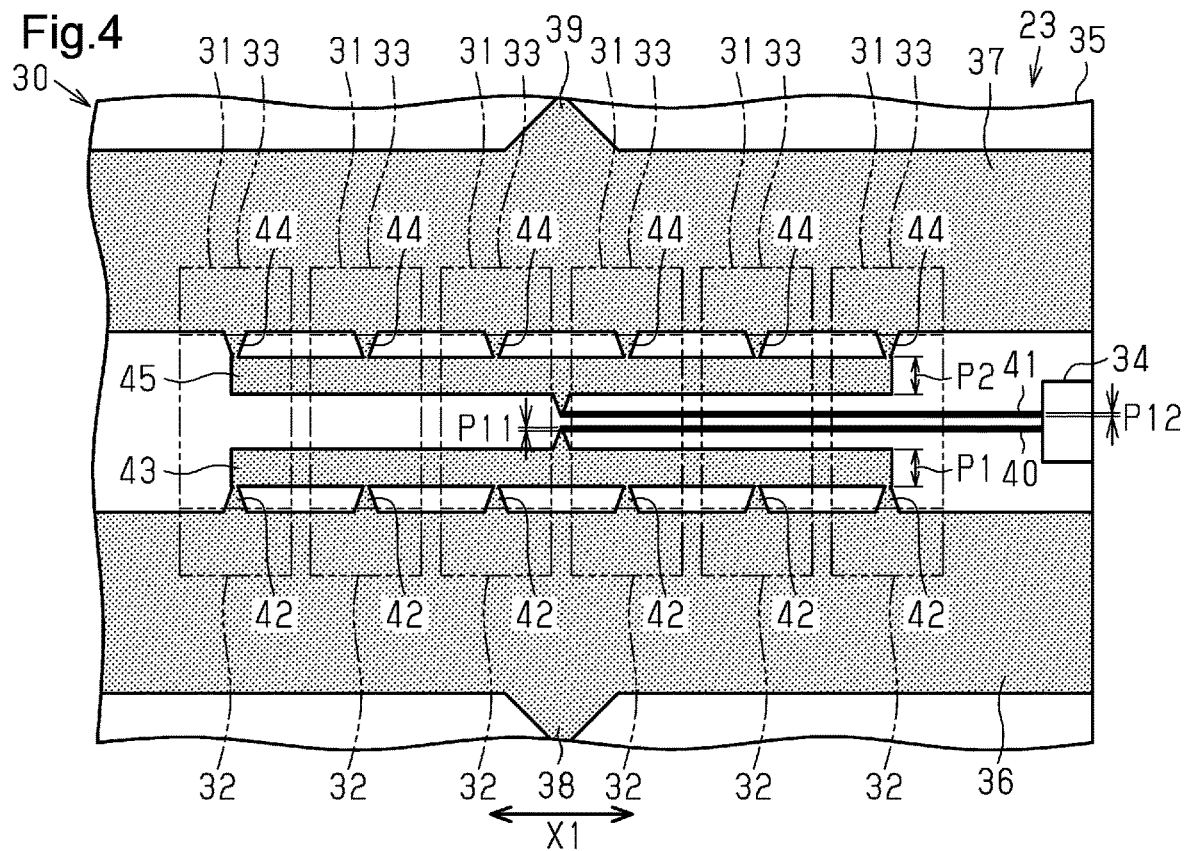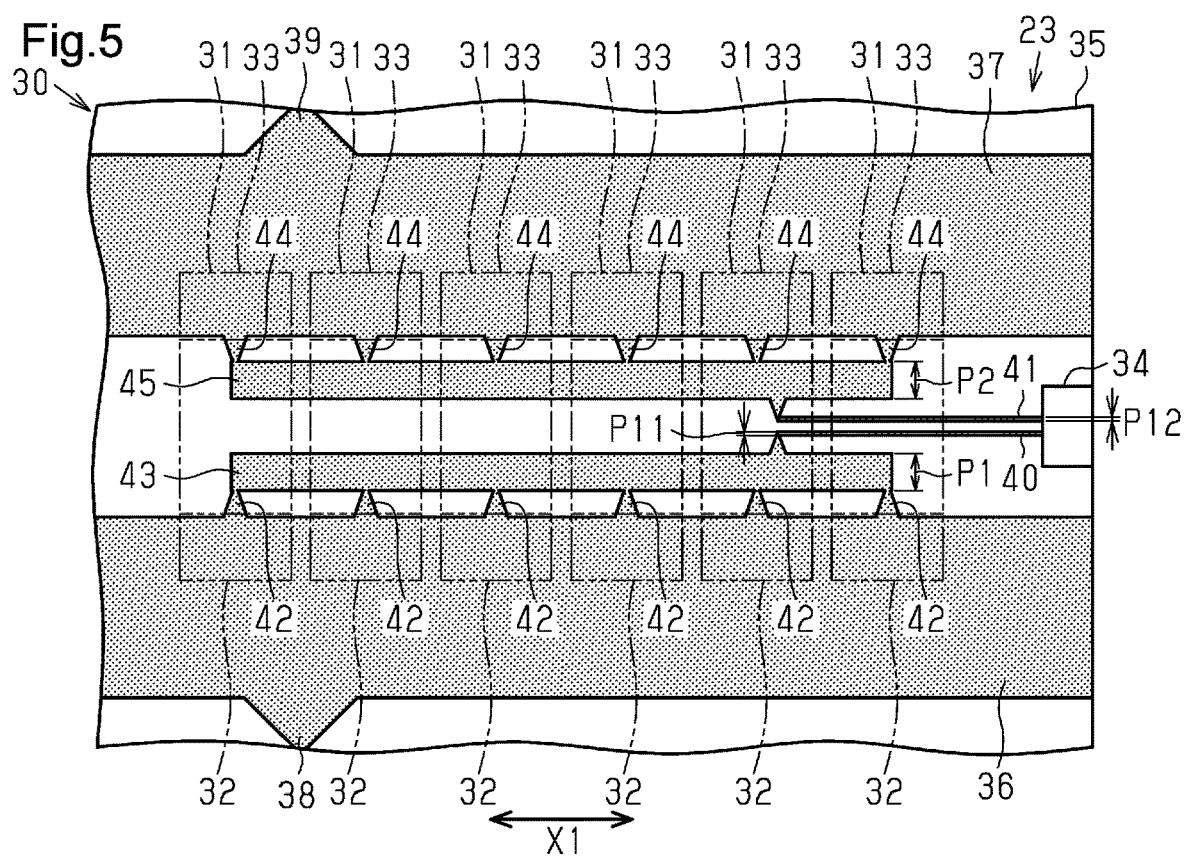

CURRENT DETECTION CIRCUIT

BACKGROUND

1. Field

The following description relates to a current detection circuit.

2. Description of Related Art

Japanese Laid-Open Patent Publication No. 2012-149934 discloses an example of a current detection circuit that uses a shunt resistor to detect current. Such a current detection circuit includes a substrate, a shunt resistor, a voltage detector, and a current detector. The substrate includes a first conductive pattern and a second conductive pattern. The shunt resistor is mounted on the substrate. The shunt resistor includes a first terminal and a second terminal. The first terminal is electrically connected to the first conductive pattern. The second terminal is electrically connected to the second conductive pattern.

When, for example, current flows from the first conductive pattern via the first and second terminals to the second conductive pattern, voltage is generated between the first terminal and the second terminal. The voltage detector detects the voltage generated between the first and second terminals. Then, the current detector detects current from the voltage detected by the voltage detector.

It is important that the voltage detector accurately detects the voltage generated between the first and second terminals of the shunt resistor to increase the current detection accuracy of the current detector. Accordingly, the current detection circuit uses a known four-terminal connection (Kelvin connection) to detect the voltage generated between the first and second terminals of the shunt resistor. In such a current detection circuit using the four-terminal sensing, the substrate includes a first sensing pattern and a second sensing pattern. The first sensing pattern includes a first end electrically connected to the first terminal of the shunt resistor, and a second end electrically connected to the voltage detector. The second sensing pattern includes a first end electrically connected to the second terminal of the shunt resistor, and a second end electrically connected to the voltage detector.

With this configuration, the first and second conductive patterns are isolated from the first and second sensing patterns that detect the voltage generated between the first and second terminals of the shunt resistor. This allows the voltage detector to detect the voltage generated between the first and second terminals of the shunt resistor without being affected by a voltage drop caused by the current flowing through the first and second conductive patterns. As a result, the voltage detector accurately detects the voltage generated between the first and second terminals of the shunt resistor.

Patent Literature 1: Japanese Laid-Open Patent Publication No. 2012-149934

SUMMARY

In such a current detection circuit, multiple shunt resistors may be mounted on the substrate for delivering relatively high rated power. The shunt resistors are, for example, arranged next to one another in a single direction and connected in parallel. In this case, the voltages generated between the first and second terminals of the shunt resistors may vary due to differences in the currents flowing through the shunt resistors. The voltages generated between the first and second terminals of the shunt resistors located closer to the first and second sensing patterns will have a greater effect on the voltage detected by the voltage detector. This may lower the current detection accuracy of the current detector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a current detection circuit includes a substrate, shunt resistors, a voltage detector, and a current detector. The substrate includes a first conductive pattern and a second conductive pattern. The shunt resistors each include a first terminal electrically connected to the first conductive pattern and a second terminal electrically connected to the second conductive pattern. The voltage detector detects voltage generated between the first terminal and the second terminal. The current detector detects current based on the voltage detected by the voltage detector. The shunt resistors are mounted on the substrate. The shunt resistors are arranged next to one another in a single direction and connected in parallel. The substrate includes a first sensing pattern, a second sensing pattern, first connection patterns, a first aggregation pattern, second connection patterns, and a second aggregation pattern. The first sensing pattern includes a first end electrically connected to the first terminals of the shunt resistors and a second end electrically connected to the voltage detector. The second sensing pattern includes a first end electrically connected to the second terminals of the shunt resistors and a second end electrically connected to the voltage detector. The first connection patterns are respectively provided for the first terminals of the shunt resistors and electrically connected to the first terminals. The first aggregation pattern extends in an arrangement direction of the shunt resistors and aggregates the first connection patterns. The first aggregation pattern is electrically connected to the first end of the first sensing pattern and has a pattern width that is wider than a pattern width of the first sensing pattern. The second connection patterns are respectively provided for the second terminals of the shunt resistors and electrically connected to the second terminals. The second aggregation pattern extends in the arrangement direction and aggregates the second connection patterns. The second aggregation pattern is electrically connected to the first end of the second sensing pattern and has a pattern width that is wider than a pattern width of the second sensing pattern.

Other features and aspects will be apparent from the following detailed description, the drawings, and the claims.

BRIEF DESCRIPTION OF THE DRAWINGS

FIG. 4 is a diagram schematically showing the current detection circuit.

FIG. 5 is a diagram schematically showing a current detection circuit in accordance with another embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An embodiment of a current detection circuit will now be described with reference to FIGS. 1 to 4. The current detection circuit described below is arranged on a motor-driven compressor. The motor-driven compressor of the present embodiment is for use with, for example, a vehicle air conditioner.

Motor-Driven Compressor

Figure 1:
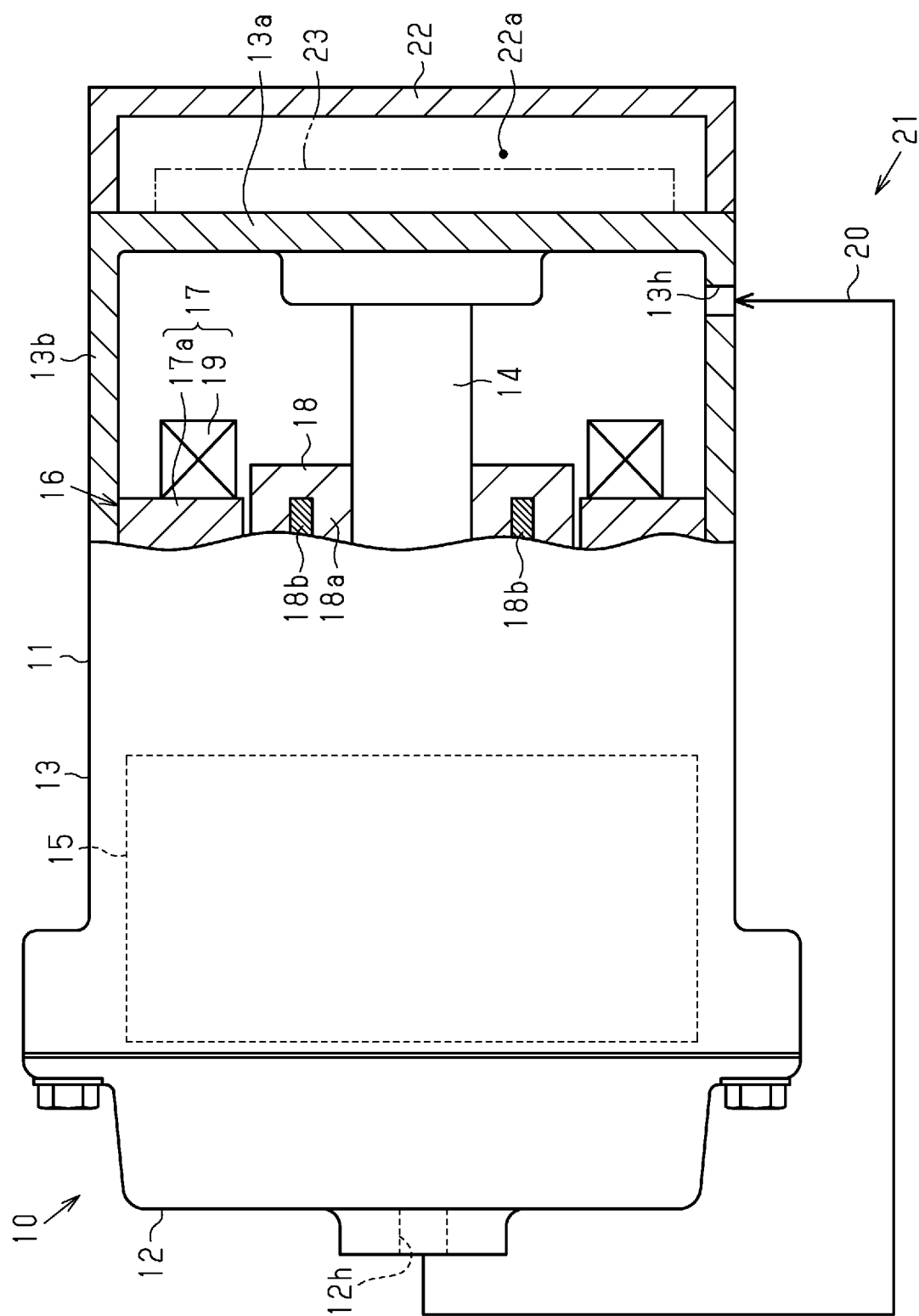
FIG. 1 is a cross-sectional view of a motor-driven compressor in accordance with an embodiment.

As shown in FIG. 1, a motor-driven compressor 10 includes a housing 11. The housing 11 includes a discharge housing 12 and a motor housing 13. The discharge housing 12 and the motor housing 13 are formed from a metal material. The discharge housing 12 and the motor housing 13 are formed from, for example, aluminum. The motor housing 13 includes an end wall 13a and a circumferential wall 13b. The end wall 13a is, for example, disc-shaped. The circumferential wall 13b extends from an outer circumferential portion of the end wall 13a.

The motor-driven compressor 10 includes a rotary shaft 14. The rotary shaft 14 is accommodated in the motor housing 13. The rotary shaft 14 has a rotation axis that coincides with the axis of the circumferential wall 13b of the motor housing 13. The rotary shaft 14 is rotatably supported by the motor housing 13.

The motor-driven compressor 10 includes a compression unit 15. The compression unit 15 is accommodated in the motor housing 13. The compression unit 15 is driven by rotation of the rotary shaft 14 to compress a refrigerant, which is a fluid. The compression unit 15 is, for example, of a scroll type and includes a fixed scroll (not shown) fixed to the motor housing 13 and a movable scroll (not shown) arranged opposing the fixed scroll. The motor-driven compressor 10 includes a motor 16. The motor 16 is accommodated in the motor housing 13. The motor 16 rotates the rotary shaft 14. The rotation of the rotary shaft 14 drives the compression unit 15. The compression unit 15 and the motor 16 are arranged next to each other in an axial direction of the rotary shaft 14. The motor 16 is located closer to the end wall 13a of the motor housing 13 than the compression unit 15.

The motor 16 includes a cylindrical stator 17 and a cylindrical rotor 18. The rotor 18 is arranged at the inner side of the stator 17. The rotor 18 rotates integrally with the rotary shaft 14. The stator 17 surrounds the rotor 18. The rotor 18 includes a rotor core 18a and permanent magnets 18b. The rotor core 18a is fixed to the rotary shaft 14. The permanent magnets 18b are arranged on the rotor core 18a.

The stator 17 includes a cylindrical stator core 17a and motor coils 19 wound around the stator core 17a. When power is supplied to the motor coils 19, the rotor 18 is rotated. The rotary shaft 14 is rotated integrally with the rotor 18.

The motor housing 13 includes a suction port 13h. The suction port 13h is formed in the circumferential wall 13b of the motor housing 13. The suction port 13h draws the refrigerant into the motor housing 13. The discharge housing 12 includes a discharge port 12h. The discharge port 12h is connected to a first end of an external refrigerant circuit 20. The suction port 13h is connected to a second end of the external refrigerant circuit 20.

The refrigerant is drawn from the external refrigerant circuit 20 through the suction port 13h into the motor housing 13. The compression unit 15 is driven to compress the refrigerant. The refrigerant compressed by the compression unit 15 is discharged out of the discharge port 12h into the external refrigerant circuit 20. Then, the discharged refrigerant flows through a heat exchanger and an expansion valve of the external refrigerant circuit 20 and returns through the suction port 13h to the motor housing portion 13. The motor-driven compressor 10 and the external refrigerant circuit 20 form a vehicle air conditioner 21.

The housing 11 includes a cover 22. The cover 22 is tubular. The cover 22 is coupled to the end wall 13a of the motor housing 13. The end wall 13a of the motor housing 13 and the cover 22 define an inverter chamber 22a.

The motor-driven compressor 10 includes an inverter 23. The inverter 23 drives the motor 16. The inverter 23 is accommodated in the inverter chamber 22a. The compression unit 15, the motor 16, and the inverter 23 are arranged in this order in the axial direction of the rotary shaft 14.

Figure 2:
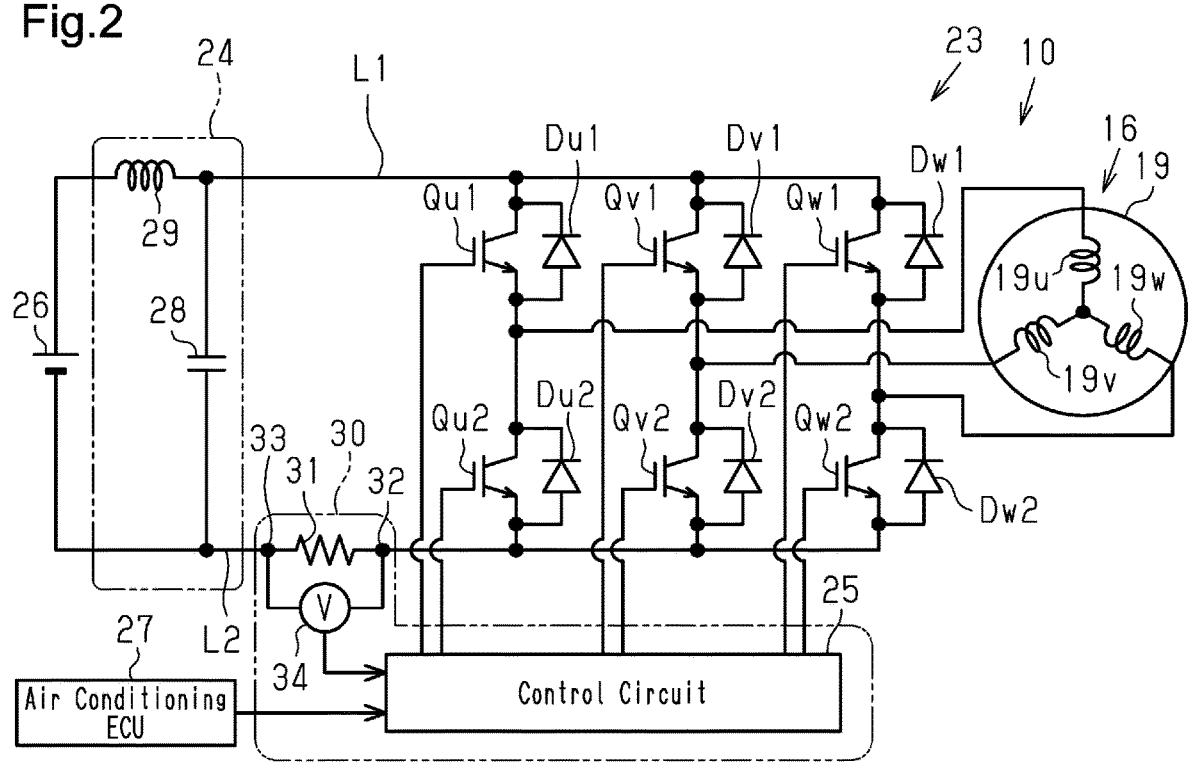
FIG. 2 is a circuit diagram showing the electrical configuration of the motor-driven compressor.

As shown in FIG. 2, the motor coils 19 of the motor 16 has a three-phase construction including a u-phase motor coil 19u, a v-phase motor coil 19v, and a w-phase motor coil 19w. In the present embodiment, the u-phase motor coil 19u, the v-phase motor coil 19v, and the w-phase motor coil 19w form a Y-connection.

The inverter 23 includes switching elements Qu1, Qu2, Qv1, Qv2, Qw1, and Qw2 and a filter circuit 24. The motor-driven compressor 10 further includes a control circuit 25.

The switching elements Qu1, Qu2, Qv1, Qv2, Qw1, and Qw2 perform switching to drive the motor 16. The switching elements Qu1, Qu2, Qv1, Qv2, Qw1, and Qw2 are insulated gate bipolar transistors (IGBTs) used as power switching elements. The switching elements Qu1, Qu2, Qv1, Qv2, Qw1, and Qw2 are connected to diodes Du1, Du2, Dv1, Dv2, Dw1, and Dw2, respectively.

The switching elements Qu1 and Qu2 are connected in series, the switching elements Qv1 and Qv2 are connected in series, and the switching elements Qw1 and Qw2 are connected in series. The gates of the switching elements Qu1, Qu2, Qv1, Qv2, Qw1, and Qw2 are electrically connected to the control circuit 25. The collectors of the switching elements Qu1, Qv1, and Qw1 are electrically connected to the positive electrode of an external power supply 26 via a positive electrode line L1. The emitters of the switching elements Qu2, Qv2, and Qw2 are electrically connected to the negative electrode of the external power supply 26 via a negative electrode line L2. Middle points at which the emitters of the switching elements Qu1, Qv1, and Qw1 and the collectors of the switching elements Qu2, Qv2, and Qw2 are connected in series are electrically connected to the u-phase motor coil 19u, the v-phase motor coil 19v, and the w-phase motor coil 19w, respectively.

The control circuit 25 controls a drive voltage of the motor 16 through pulse width modulation. Specifically, the control circuit 25 generates pulse width modulation (PWM) signals from a high-frequency triangular wave signal, which is referred to as a carrier wave signal, and a voltage instruction signal, which is for instructing a voltage. The control circuit 25 performs on-off control on the switching elements Qu1, Qu2, Qv1, Qv2, Qw1, and Qw2 using the generated PWM signals. In this manner, the control circuit 25 controls switching of the switching elements Qu1, Qu2, Qv1, Qv2, Qw1, and Qw2. This converts the direct current from the external power supply 26 into an alternating current. The converted alternating current is output as an output current to the motor 16 to control and drive the motor 16.

Further, the control circuit 25 controls the PWM signals to variably control the on-off duty ratio of the switching elements Qu1, Qu2, Qv1, Qv2, Qw1, and Qw2. This controls the rotation speed of the motor 16. The control circuit 25 is electrically connected to an air conditioning electronic control unit (ECU) 27. When the control circuit 25 receives information related to a target rotation speed of the motor 16 from the air conditioning ECU 27, the control circuit 25 controls the motor 16 to generate rotation at the target rotation speed.

The filter circuit 24 is arranged between the external power supply 26 and the switching elements Qu1, Qu2, Qv1, Qv2, Qw1, and Qw2. The filter circuit 24 includes a capacitor 28 and a coil 29. The capacitor 28 is electrically connected to the coil 29.

Current Detection Circuit

The inverter 23 includes a current detection circuit 30. The current detection circuit 30 includes a shunt resistor 31. The shunt resistor 31 is arranged in the negative electrode line L2. The shunt resistor 31 includes a first terminal 32 and a second terminal 33. The current detection circuit 30 includes a voltmeter 34 serving as a voltage detector. The voltmeter 34 detects the voltage generated between the first terminal 32 and the second terminal 33 of the shunt resistor 31.

The voltmeter 34 is electrically connected to the control circuit 25. Information related to the voltage detected by the voltmeter 34 is transmitted to the control circuit 25. The control circuit 25 stores in advance a program used to obtain the current supplied from the external power supply 26 to the inverter 23 based on the information related to the voltage transmitted from the voltmeter 34. In this manner, the control circuit 25 also acts as a current detector that detects the current based on the voltage detected by the voltmeter 34.

Figure 3:
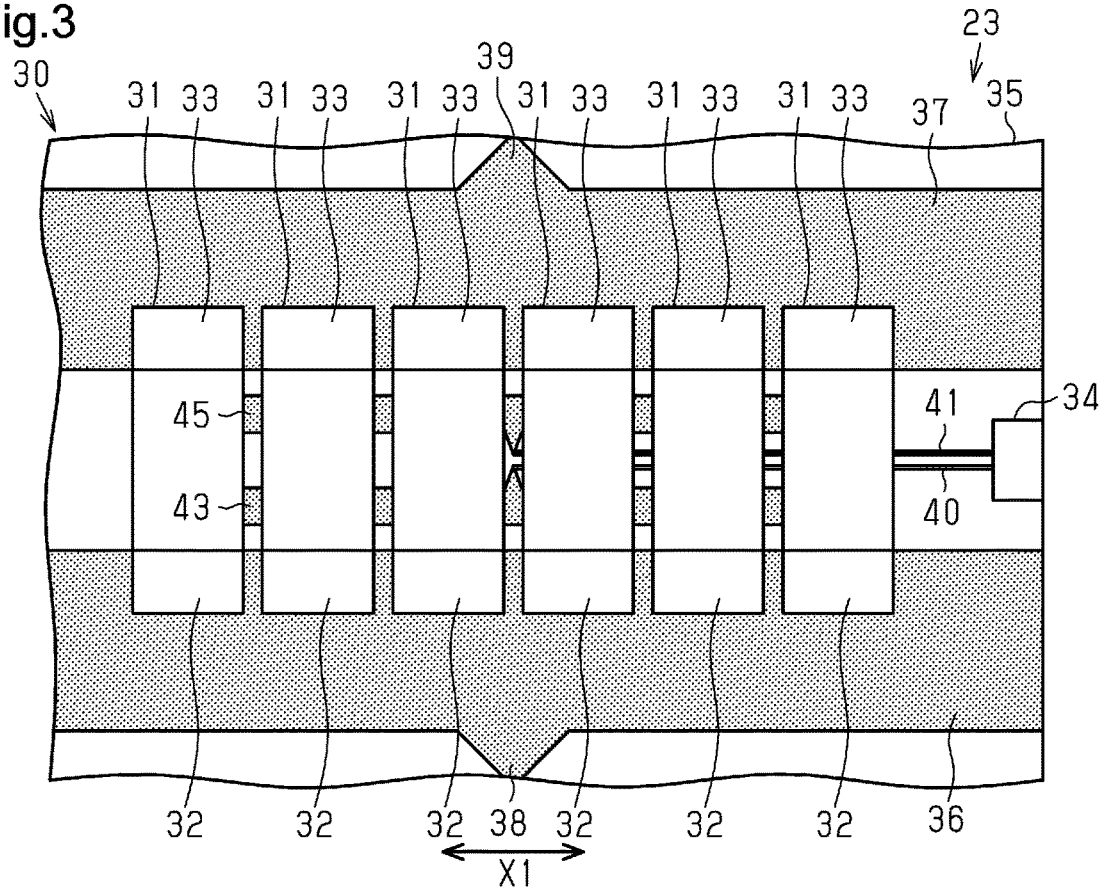
FIG. 3 is a diagram schematically showing a current detection circuit.

As shown in FIG. 3, the current detection circuit 30 includes a substrate 35. The substrate 35 includes a first conductive pattern 36 and a second conductive pattern 37. The first conductive pattern 36 and the second conductive pattern 37 are arranged on a first surface, which is one of the surfaces of the substrate 35. The first conductive pattern 36 and the second conductive pattern 37 are solid patterns. The first conductive pattern 36 and the second conductive pattern 37 are separated from each other. The first conductive pattern 36 and the second conductive pattern 37 of the present embodiment form part of the negative electrode line L2.

More than one shunt resistor 31 is mounted on the substrate 35. For example, six shunt resistors 31 are mounted on the substrate 35. Each shunt resistor 31 is mounted on the first surface of the substrate 35. The first terminal 32 of each shunt resistor 31 is electrically connected to the first conductive pattern 36. The second terminal 33 of each shunt resistor 31 is electrically connected to the second conductive pattern 37. The shunt resistors 31 are arranged next to one another in a single direction and connected in parallel. More specifically, the first terminals 32 of the shunt resistors 31 are aligned in a single direction, and the second terminals 33 of the shunt resistors 31 are aligned in a single direction. The first terminals 32 of the shunt resistors 31 are connected in parallel via the first conductive pattern 36, and the second terminals 33 of the shunt resistors 31 are connected in parallel via the second conductive pattern 37. In the description hereafter, an arrangement direction X1 in which the shunt resistors 31 are arranged next to one another may simply be referred to as "the arrangement direction X1".

The first conductive pattern 36 includes an input portion 38. Current is input to the input portion 38. The second conductive pattern 37 includes an output portion 39. Current is output from the output portion 39. In a direction orthogonal to the arrangement direction X1, the input portion 38 and the output portion 39 are arranged facing the shunt resistors 31 that are located toward the middle of the arrangement of the shunt resistors 31 in the arrangement direction X1. Further, the input portion 38 and the output portion 39 face each other in a direction orthogonal to the arrangement direction X1.

The input portion 38 receives the current from the emitters of the switching elements Qu2, Qv2, and Qw2. The current input from the input portion 38 to the first conductive pattern 36 flows through the shunt resistors 31 to the second conductive pattern 37. The current flowing through the second conductive pattern 37 is output from the output portion 39 to the negative electrode of the external power supply 26.

As shown in FIG. 4, the substrate 35 includes a first sensing pattern 40 and a second sensing pattern 41. The substrate 35 further includes first connection patterns 42, a first aggregation pattern 43, second connection patterns 44, and a second aggregation pattern 45.

The first connection patterns 42 are respectively provided for the first terminals 32 of the shunt resistors 31 and electrically connected to the first terminals 32. Thus, the first connection patterns 42 are arranged next to one another at predetermined intervals in the arrangement direction X1. Each first connection pattern 42 projects from the first terminal 32 of the corresponding shunt resistor 31 toward the second conductive pattern 37.

The first aggregation pattern 43 extends in the arrangement direction X1 of the shunt resistors 31. The first aggregation pattern 43 is electrically connected to the first connection patterns 42. The first aggregation pattern 43 aggregates the first connection patterns 42.

The second connection patterns 44 are respectively provided for the second terminals 33 of the shunt resistors 31 and electrically connected to the second terminals 33. Thus, the second connection patterns 44 are arranged next to one another at predetermined intervals in the arrangement direction X1. Each second connection pattern 44 projects from the second terminal 33 of the corresponding shunt resistor 31 toward the first conductive pattern 36.

The second aggregation pattern 45 extends in the arrangement direction X1 of the shunt resistors 31. The second aggregation pattern 45 is electrically connected to the second connection patterns 44. The second aggregation pattern 45 aggregates the second connection patterns 44.

Therefore, the first terminal 32 of each shunt resistor 31 includes a force terminal electrically connected to the first conductive pattern 36, and a sense terminal electrically connected to the first connection pattern 42. The second terminal 33 of each shunt resistor 31 includes a force terminal electrically connected to the second conductive pattern 37 and a sense terminal electrically connected to the second connection pattern 44. In this manner, the current detection circuit 30 of the present embodiment employs a known four-terminal connection (Kelvin connection).

The first sensing pattern 40 includes a first end electrically connected to the first aggregation pattern 43. Specifically, the first end of the first sensing pattern 40 is connected to a central part of the first aggregation pattern 43 in the arrangement direction X1. Thus, the first end of the first sensing pattern 40 is electrically connected via the first aggregation pattern 43 and the first connection patterns 42 to the first terminals 32 of the shunt resistors 31. The first sensing pattern 40 extends in the arrangement direction X1 from the central part of the first aggregation pattern 43 with respect to the arrangement direction X1. The first sensing pattern 40 includes a second end electrically connected via an operational amplifier (not shown) to the voltmeter 34. In this manner, the first end of the first sensing pattern 40 is electrically connected to the first terminals 32 of the shunt resistors 31, and the second end of the first sensing pattern 40 is electrically connected to the voltmeter 34.

The second sensing pattern 41 includes a first end electrically connected to the second aggregation pattern 45. Specifically, the first end of the second sensing pattern 41 is connected to a central part of the second aggregation pattern 45 in the arrangement direction X1. Thus, the first end of the second sensing pattern 41 is electrically connected via the second aggregation pattern 45 and the second connection patterns 44 to the second terminals 33 of the shunt resistors 31. The second sensing pattern 41 extends in the arrangement direction X1 from the central part of the second aggregation pattern 45 with respect to the arrangement direction X1. The second sensing pattern 41 includes a second end electrically connected via the operational amplifier to the voltmeter 34. In this manner, the first end of the second sensing pattern 41 is electrically connected to the second terminals 33 of the shunt resistors 31, and the second end of the second sensing pattern 41 is electrically connected to the voltmeter 34.

The first aggregation pattern 43 has a pattern width P1 that is wider than a pattern width P11 of the first sensing pattern 40. The pattern width P1 of the first aggregation pattern 43 is measured in a direction orthogonal to the direction of the current flowing through the first aggregation pattern 43. The pattern width P1 of the first aggregation pattern 43 is measured in a direction orthogonal to the arrangement direction X1. The pattern width P11 of the first sensing pattern 40 is measured in a direction orthogonal to the direction of the current flowing through the first sensing pattern 40. The pattern width P11 of the first sensing pattern 40 is measured in a direction orthogonal to the arrangement direction X1 in a portion of the first sensing pattern 40 that extends in the arrangement direction X1. In this manner, the first aggregation pattern 43, which is electrically connected to the first end of the first sensing pattern 40, has the pattern width P1 that is wider than the pattern width P11 of the first sensing pattern 40.

The second aggregation pattern 45 has a pattern width P2 that is wider than a pattern width P12 of the second sensing pattern 41. The pattern width P2 of the second aggregation pattern 45 is measured in a direction orthogonal to the direction of the current flowing through the second aggregation pattern 45. The pattern width P2 of the second aggregation pattern 45 is measured in a direction orthogonal to the arrangement direction X1. The pattern width P12 of the second sensing pattern 41 is measured in a direction orthogonal to the direction of the current flowing through the second sensing pattern 41. The pattern width P12 of the second sensing pattern 41 is measured in a direction orthogonal to the arrangement direction X1 in a portion of the second sensing pattern 41 that extends in the arrangement direction X1. In this manner, the second aggregation pattern 45, which is electrically connected to the first end of the second sensing pattern 41, has a pattern width P2 that is wider than the pattern width P12 of the second sensing pattern 41.

Operation of the Embodiment

The operation of the embodiment will now be described.

In the current detection circuit 30 having the above-described configuration, the voltages applied to the first terminals 32 of the shunt resistors 31 are aggregated via the first connection patterns 42 to the first aggregation pattern 43. Also, the voltages applied to the second terminals 33 of the shunt resistors 31 are aggregated via the second connection patterns 44 to the second aggregation pattern 45. Further, the first aggregation pattern 43 is electrically connected to the first end of the first sensing pattern 40, and the second aggregation pattern 45 is electrically connected to the first end of the second sensing pattern 41. Thus, the voltmeter 34 detects the voltage generated between the first aggregation pattern 43 and the second aggregation pattern 45. This avoids a situation in which the voltages generated in the shunt resistors 31 located closer to the first sensing pattern 40 and the second sensing pattern 41 would have a greater effect on the voltage detected by the voltmeter 34. Therefore, the current detection accuracy of the control circuit 25 will not be lowered even if differences in the currents flowing through the shunt resistors 31 vary the voltages generated between the first terminals 32 and the second terminals 33 of the shunt resistors 31.

Furthermore, the first aggregation pattern 43 has the pattern width P1 that is wider than the pattern width P11 of the first sensing pattern 40, and the second aggregation pattern 45 has the pattern width P2 that is wider than the pattern width P12 of the second sensing pattern 41. This reduces the impedance of the first aggregation pattern 43 and the second aggregation pattern 45.

Advantages of the Embodiment

The above embodiment has the following advantages.

(1) The voltages applied to the first terminals 32 of the shunt resistors 31 are aggregated via the first connection patterns 42 to the first aggregation pattern 43. The voltages applied to the second terminals 33 of the shunt resistors 31 are aggregated via the second connection patterns 44 to the second aggregation pattern 45. The voltmeter 34 detects the voltage generated between the first aggregation pattern 43 and the second aggregation pattern 45. This avoids a situation in which the voltages generated in the shunt resistors 31 that are located closer to the first sensing pattern 40 and the second sensing pattern 41 would have a greater effect on the voltage detected by the voltmeter 34. Thus, the current detection accuracy of the control circuit 25 will not be lowered even if differences in the currents flowing through the shunt resistors 31 vary the voltages generated between the first terminals 32 and the second terminals 33 of the shunt resistors 31. Furthermore, the first aggregation pattern 43 has the pattern width P1 that is wider than the pattern width P11 of the first sensing pattern 40, and the second aggregation pattern 45 has the pattern width P2 that is wider than the pattern width P12 of the second sensing pattern 41. This reduces the impedance of the first aggregation pattern 43 and the second aggregation pattern 45, thereby improving the voltage detection accuracy of the voltmeter 34. As a result, the current detection accuracy of the control circuit 25 is improved.

(2) In a direction orthogonal to the arrangement direction X1, the input portion 38 and the output portion 39 are arranged facing the shunt resistors 31 that are located toward the middle of the arrangement of the shunt resistors 31 in the arrangement direction X1. With such a layout of the input portion 38 and the output portion 39, the current flows evenly through the shunt resistors 31. This minimizes differences in the currents flowing through the shunt resistors 31. Further, when the input portion 38 and the output portion 39 are arranged in such a layout, the first sensing pattern 40 is connected to the central part of the first aggregation pattern 43 in the arrangement direction X1. Also, the second sensing pattern 41 is connected to the central part of the second aggregation pattern 45 in the arrangement direction X1. This readily avoids a situation in which the currents flowing through the first aggregation pattern 43 and the first sensing pattern 40 are uneven, and the currents flowing through the second aggregation pattern 45 and the second sensing pattern 41 are uneven. Therefore, the voltmeter 34 has improved voltage detection accuracy, which, in turn, improves the current detection accuracy of the control circuit 25.

MODIFIED EXAMPLES

The above embodiment may be modified as described below. The above embodiment and the following modifications can be combined as long as the combined modifications remain technically consistent with each other.

As shown in FIG. 5, in a direction orthogonal to the arrangement direction X1, the input portion 38 and the output portion 39 can be arranged facing the shunt resistors 31 that are located toward one side of the arrangement of the shunt resistors 31 in the arrangement direction X1. When the input portion 38 and the output portion 39 are arranged in such a layout, the first sensing pattern 40 is connected to a part of the first aggregation pattern 43 located toward the other side of the arrangement of the shunt resistors 31 in the arrangement direction X1. Further, the second sensing pattern 41 is connected to a part of the second aggregation pattern 45 located toward the other side of the arrangement of the shunt resistors 31 in the arrangement direction X1. This readily avoids a situation in which the currents flowing through the first aggregation pattern 43 and the first sensing pattern 40 are uneven, and the currents flowing through the second aggregation pattern 45 and the second sensing pattern 41 are uneven. Therefore, the voltmeter 34 has improved voltage detection accuracy, which, in turn, improves the current detection accuracy of the control circuit 25.

In the embodiment, the shunt resistors 31 are arranged in the negative electrode line L2. However, there is no limit to such a configuration and the shunt resistors 31 may be arranged, for example, in the positive electrode line L1. Alternatively, the shunt resistors 31 may be arranged, for example, between the u-phase motor coil 19*u* and the middle point at which the emitter and the collector of the switching element Qu1 are connected in series.

In the embodiment, the number of shunt resistors 31 is not particularly limited as long as the number is more than one.

In the embodiment, the current detection circuit 30 may use, for example, an analog-to-digital (AD) converter as a voltage detector instead of the voltmeter 34. The AD converter converts an analog voltage value to a digital voltage value.

In the embodiment, the compression unit 15 does not have to be a scroll type and may be, for example, a piston type, a vane type, or the like.

In the embodiment, the motor-driven compressor 10 is for use with the vehicle air conditioner 21. Instead, the motor-driven compressor 10 may be, for example, installed in a fuel cell vehicle and compress air, which is a fluid supplied to the fuel cell, with the compression unit 15.

In the embodiment, the current detection circuit 30 does not have to be incorporated in the motor-driven compressor 10.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A current detection circuit, comprising:
a substrate including a first conductive pattern and a second conductive pattern;
shunt resistors, each including a first terminal electrically connected to the first conductive pattern and a second terminal electrically connected to the second conductive pattern;
a voltage detector that detects voltage generated between the first terminal and the second terminal; and
a current detector that detects current based on the voltage detected by the voltage detector, wherein
the shunt resistors are mounted on the substrate,
the shunt resistors are arranged next to one another in a single direction and connected in parallel, and
the substrate includes:
a first sensing pattern including a first end electrically connected to the first terminals of the shunt resistors and a second end electrically connected to the voltage detector;
a second sensing pattern including a first end electrically connected to the second terminals of the shunt resistors and a second end electrically connected to the voltage detector;
first connection patterns respectively provided for the first terminals of the shunt resistors and electrically connected to the first terminals;
a first aggregation pattern extending in an arrangement direction of the shunt resistors and aggregating the first connection patterns, the first aggregation pattern being electrically connected to the first end of the first sensing pattern and having a pattern width that is wider than a pattern width of the first sensing pattern;

second connection patterns respectively provided for the second terminals of the shunt resistors and electrically connected to the second terminals; and a second aggregation pattern extending in the arrangement direction and aggregating the second connection patterns, the second aggregation pattern being electrically connected to the first end of the second sensing pattern and having a pattern width that is wider than a pattern width of the second sensing pattern.

2. The current detection circuit according to claim 1, wherein:

the first conductive pattern includes an input portion to which current is input;

the second conductive pattern includes an output portion from which current is output;

in a direction orthogonal to the arrangement direction, the input portion and the output portion are arranged facing ones of the shunt resistors that are located toward a middle of the arrangement of the shunt resistors in the arrangement direction;

the first sensing pattern is connected to a central part of the first aggregation pattern in the arrangement direction; and the second sensing pattern is connected to a central part of the second aggregation pattern in the arrangement direction.

3. The current detection circuit according to claim 1, wherein:

the first conductive pattern includes an input portion to which current is input;

the second conductive pattern includes an output portion from which current is output;

in a direction orthogonal to the arrangement direction, the input portion and the output portion are arranged facing ones of the shunt resistors that are located toward one side of the arrangement of the shunt resistors in the arrangement direction;

the first sensing pattern is connected to a part of the first aggregation pattern located toward an other side of the arrangement of the shunt resistors in the arrangement direction; and the second sensing pattern is connected to a part of the second aggregation pattern located toward the other side of the arrangement of the shunt resistors in the arrangement direction.

* * * * *